(12) United States Patent
Hobmeyr et al.

(10) Patent No.: US 9,911,994 B2
(45) Date of Patent: Mar. 6, 2018

(54) PIEZOELECTRIC INJECTOR FOR FUEL CELL (75) Inventors: Ralph Hobmeyr, Mainz-Kastel (DE); Björn Zörner, Trebur (DE); Marcus Jung, Alsbach-Hähnlein (DE)

(73) Assignee: GM Global Technology Operations LLC, Detroit, MI (US)

( * ) Notice: Subject to any disclaimer, the term of this patent is extended or adjusted under 35 U.S.C. 154(b) by 1130 days.

(21) Appl. No.: 13/116,250

(22) Filed: May 26, 2011

(65) Prior Publication Data

US 2012/0301807 A1    Nov. 29, 2012

(51) Int. Cl.
*H01M 8/04* (2016.01)
*H01M 8/0438* (2016.01)
*H01M 8/04746* (2016.01)

(52) U.S. Cl.
CPC ... *H01M 8/04388* (2013.01); *H01M 8/04425* (2013.01); *H01M 8/04753* (2013.01); *H01M 8/04776* (2013.01)

(58) Field of Classification Search
CPC ...... H01M 8/04089–8/04156; H01M 8/04388; H01M 8/04425; H01M 8/04776; H01M 8/04753
USPC ................. 429/444, 513, 515, 446
See application file for complete search history.

(56) References Cited

U.S. PATENT DOCUMENTS

| | | | | |
|---|---|---|---|---|
| 4,141,243 A | * | 2/1979 | Van Tassel et al. | 73/114.48 |
| 2003/0072982 A1 | * | 4/2003 | Takeuchi | C01B 3/323 429/424 |
| 2003/0143444 A1 | * | 7/2003 | Liu et al. | 429/19 |
| 2003/0230648 A1 | * | 12/2003 | Rao | 239/585.1 |
| 2004/0135840 A1 | * | 7/2004 | Wanibe | 347/20 |
| 2005/0202301 A9 | * | 9/2005 | Kuriiwa et al. | 429/34 |
| 2006/0115700 A1 | * | 6/2006 | Kotani et al. | 429/25 |
| 2007/0031325 A1 | * | 2/2007 | Carruthers et al. | 423/658.2 |
| 2007/0103033 A1 | * | 5/2007 | Martin | F02D 41/2096 310/317 |
| 2008/0176115 A1 | * | 7/2008 | Yamamiya | 429/13 |
| 2011/0053014 A1 | | 3/2011 | Yumita | |

FOREIGN PATENT DOCUMENTS

| | | | |
|---|---|---|---|
| DE | 112008003202 T5 | 9/2010 | |
| EP | 1 845 252 A2 | 10/2007 | |
| JP | 2004362786 A * | 12/2004 | H01M 8/04 |

OTHER PUBLICATIONS

JP 2004-362786 english translation, Translated on Feb. 22, 2014 via JPO.*
George J. Thomas and Russell H. Jones, Materials for the Hydrogen Economy, CRC Press 2007, ISBN 978-1-4200-0607-0, Chapter 13.*

* cited by examiner

*Primary Examiner* — Jimmy K Vo
(74) *Attorney, Agent, or Firm* — Quinn IP Law (57) ABSTRACT

A fuel supply system for a fuel cell is described. One embodiment of the fuel supply system includes a fuel supply vessel; a fuel spending line in fluid communication with the fuel supply vessel and the fuel cell; a piezoelectric injector in fluid communication with the fuel spending line; and a pressure sensor connected to the fuel spending line and positioned between the fuel supply vessel and the fuel cell. A method for controlling the pressure to a fuel cell is also described.

20 Claims, 7 Drawing Sheets

PIEZOELECTRIC INJECTOR FOR FUEL CELL

BACKGROUND OF THE INVENTION

This invention relates generally to controlling compressed feed gases and more particularly to controlling the pressure at the inlet of a fuel cell or other device utilizing a compressed gas feed.

Electrochemical conversion cells, commonly referred to as fuel cells, produce electrical energy by processing reactants, for example, through the oxidation and reduction of hydrogen and oxygen. The gases are often introduced into the fuel cells from pressurized storage tanks.

Mechanical pressure regulators have been used to control the pressure at the inlet to the fuel cell or other device. However, mechanical pressure regulators suffer from a number of problems. The spring force of the mechanical pressure regulator decreases over the life of the regulator, and it can also be affected by temperature. The effective pressure of the regulator is influenced by the flow rate through the regulator. The stiffness of the membrane of the spring force regulator changes over time as the material ages and deteriorates. As result of these effects, the set point of pressure regulator changes and will differ over time compared to the requested value. However, if the pressure regulator changes its set point, this deviation cannot be corrected by the mechanical pressure regulator. In addition, the mechanical parts are subject to the stick and slip effect because at high flow transient the friction is different. Furthermore, leaks in a line cannot be avoided because spring forced pressure regulators do not close very tightly. In addition, there is typically a need for several pressure steps for pressure reduction from a high pressure level (e.g., 700 bar) down to a low pressure level (e.g., 2 bar absolute). To realize small tolerance at the target pressure, several reduction steps have to be installed with mechanical spring forced pressure regulators.

SUMMARY OF THE INVENTION

One aspect of the invention is a fuel supply system for a fuel cell. One embodiment of the fuel supply system includes a fuel supply vessel; a fuel spending line in fluid communication with the fuel supply vessel and the fuel cell; a piezoelectric injector in fluid communication with the fuel spending line; and a pressure sensor connected to the fuel spending line and positioned between the fuel supply vessel and the fuel cell.

Another aspect of the invention is a method of controlling a pressure to a fuel cell. The method includes providing a fuel supply system comprising: a fuel supply vessel; a fuel spending line in fluid communication with the fuel supply vessel and the fuel cell; a piezoelectric injector in fluid communication with the fuel spending line; and a pressure sensor connected to the fuel spending line and positioned between the fuel supply vessel and the fuel cell; providing a gas flow through the fuel spending line from the fuel supply vessel; measuring a pressure with the pressure sensor; comparing the measured pressure with a reference pressure; and controlling the piezoelectric injector based on a difference between the measured pressure and the reference pressure.

DETAILED DESCRIPTION OF THE INVENTION

A piezoelectric injector is used to control the pressure in front of the fuel cell system inlet. It allows the pressure set point for the feed system to be variable. The use of piezoelectric injectors avoids the deviation which occurs in mechanical pressure regulators over the life of the regulator caused by the springs. It also reduces the number of components in the storage system because multiple pressure regulators are not required. Piezoelectric injectors increase the signal quality of the pressure at the fuel cell system inlet and the accuracy of the pressure control. They are not influenced by the temperature or the flow rate of the gas. A pressure increase between several pressure regulators is not possible because there are no mechanical pressure regulators between the vessel and the fuel cell, and as result, no creeping of gas into the several stages is possible. The pressure at the pressure sensor will not increase because the fuel cell system has a relief valve. Using a piezoelecctric injector permits the use of a pressure sensor having a smaller pressure full scale with a very small tolerance band, which allows better pressure measurement.

In one embodiment, there can be one vessel with a piezoelectric injector coupled to the fuel cell. Alternatively, more than one fuel supply vessel can be connected to the fuel cell. If more than one vessel is used, each vessel can have its its own built-in piezoelectric injector. This allows the fuel supply vessels to be controlled separately (for example, to ensure a fuel reserve). Alternatively, the output from several fuel supply vessels can be controlled by one piezoelectric injector. The system can include an optional shut off valve between the piezoelectric injector and the pressure sensor to assure that the fuel spending line can be closed completely. There can be an optional filter and/or shield to prevent contamination from entering the piezoelectric injector.

Current vehicles and systems use several pressure regulators for several pressure stages (step by step reduction). One piezoelectric injector can be used in place of two or more mechanical pressure regulators. The piezoelectric injector provides the ability to control the resulting pressure at the inlet of the fuel cell.

Figure 1:
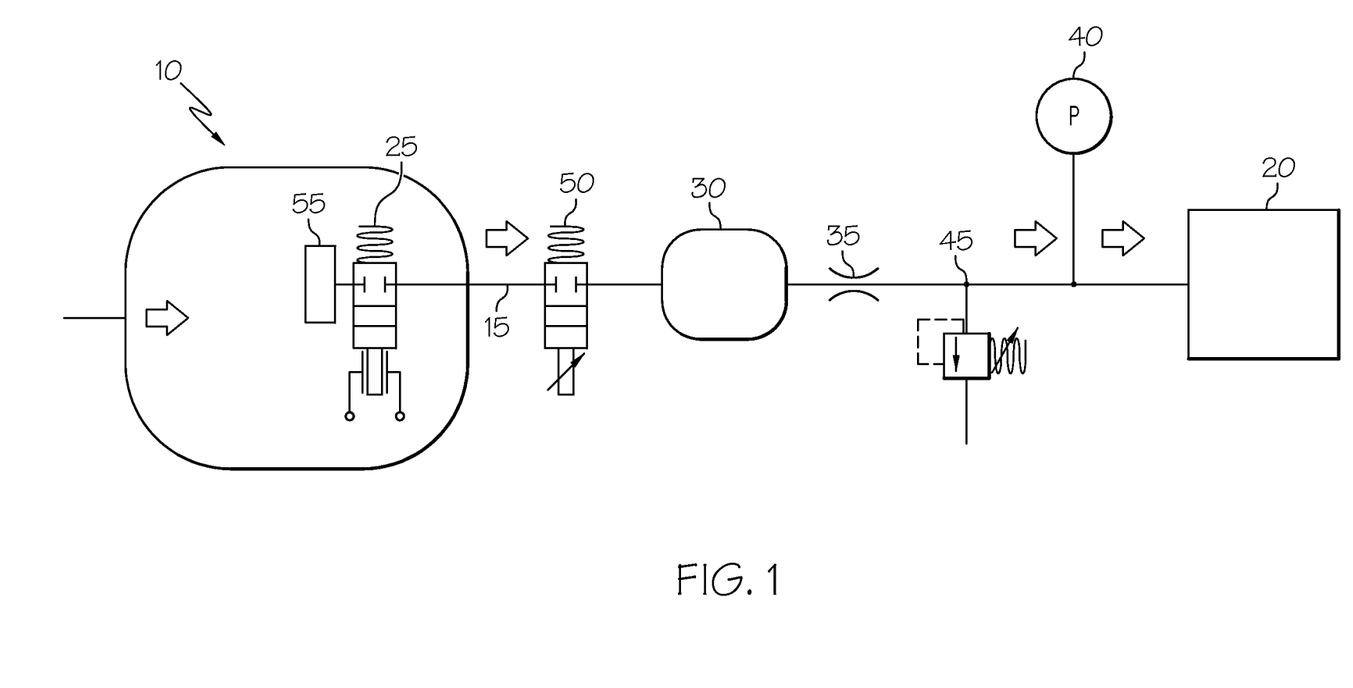
FIG. 1 is an illustration of one embodiment of a fuel supply system for a fuel cell.

In the embodiment shown in FIG. 1, there is a vessel 10 which contains the compressed gas, such as $H_2$ or compressed natural gas (CNG). The compressed gas is fed though a fuel spending line 15, which runs from the vessel 10 to the fuel cell 20. There is a piezoelectric injector 25 to control the pressure of the gas in the fuel spending line. The piezoelectric injector 25 can be located inside the vessel 10 (as shown) or outside the vessel (see FIG. 8, for example). When the piezoelectric injector 25 is inside the vessel 10, a leakproof seal is not required because any leak would be into the vessel. If the piezoelectric injector 25 is positioned in the fuel spending line 15 between vessel 10 and fuel cell 15, the function of tightness to the environment would be fulfilled by fuel spending line 15.

Figure 2:
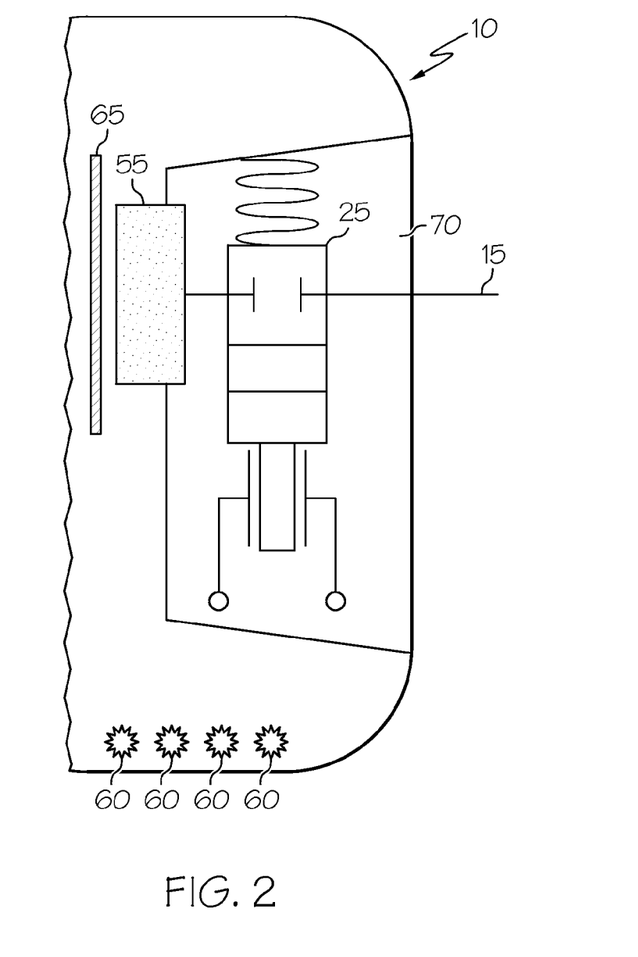
FIG. 2 is an illustration of a portion of one embodiment of a fuel supply vessel.

The compressed gas often contains contamination, which can potentially cause failure due to leaking valves. As shown in FIG. 2, particles 60 can be found in many parts of fuel cell systems, including the fueling line and fuel inlet, the vessel, filters, and other parts. Generally, the particles are at the bottom area of the vessel 10. In order to protect the piezoelectric injector 25 from this contamination, the inlet for the piezoelectric injector 25 is located in the middle of the vessel 10 or higher.

To improve the protection, an optional filter 55 could be positioned in front of the piezoelectric injector 25 inlet. Because the operation flow out of the vessel is much less than the fueling line flow to fill the vessel, smaller filter mesh sizes could be used for the filter 55 in front of the piezoelectric injector 25 to assure the cleanliness of the gas entering the piezoelectric injector.

There could also optionally be a shield 65 in front of the filter 55 to provide additional protection from particles in the vessel. The shield can be made out of any material which can block particles from entering the filter 55 and the piezoelectric injector 25 behind it. Suitable materials include, but are not limited to, stainless steel, plastic, or fiber.

The flow through filter 55 can be only in one direction to provide additional protection, if desired.

If the piezoelectric injector 25 is inside the vessel 10, it can be located in the boss 70, as shown in FIG. 2. The fueling inlet (not shown) for the vessel 10 could be integrated into boss 70, if desired. Care should be taken so that particles brought in with the fueling do not enter the fuel spending line 15, and more importantly, to the piezoelectric injector 25. One way to accomplish this would be to separate the fueling inlet from the outlet components. In another embodiment, the piezoelectric injector could be used as the fueling inlet for the vessel.

The piezoelectric injector 25 creates small pressure pulses behind it. To filter these pulses, a pressure pulse filter is provided. The pressure pulse filter is free space which can filter the pulses. For example, in current vehicles, the fuel spending line 15 is longer than 4 m. This provides a large volume for filtering the pulses, and it could be used as the pressure pulse filter. If the fuel spending line 15 is too short and/or the inner diameter is too small, the resulting volume may not provide sufficient volume to filter the pulses. To assure the filter function, an additional volume could be included, such as container 30. There can also be a flow restrictor 35, if desired. Alternatively, the flow restrictor could be the outlet for the container 30.

The pressure sensor 40 measures the pressure at the fuel cell 20 inlet. There can be a pressure relief valve 45 which protects the pressure sensor 40 and the fuel cell 20 from high pressure. The pressure relief valve 45 avoids a pressure increase when the fuel cell is not operating.

There can be an optional shut-off valve 50 between vessel 10 and the piezoelectric injector 25, if desired.

Figure 3:
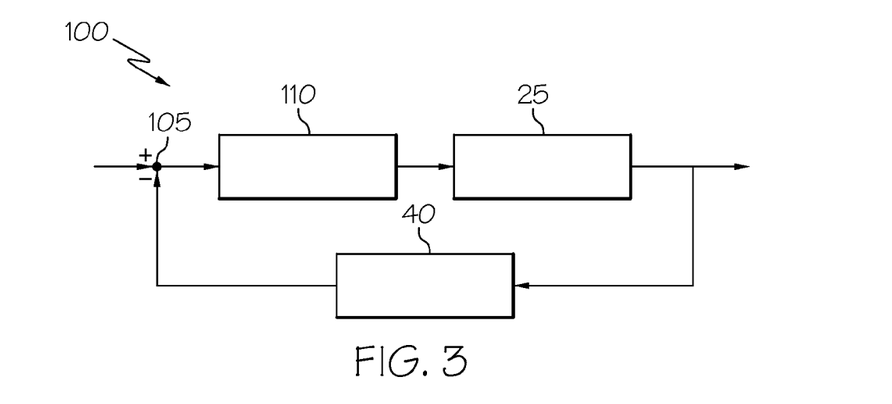
FIG. 3 is an illustration of one embodiment of a pressure control arrangement for a fuel supply system.

FIG. 3 is an illustration of one embodiment of a suitable pressure control circuit 100. In this embodiment, the control principle is a classic feedback control using the resulting pressure. The piezoelectric injector 25 controls the flow in the fuel spending line 15. The pressure at the fuel cell 20 is measured by the pressure sensor 40, and compared to a desired nominal pressure at 105. Controller 110 controls the piezoelectric injector 25 based on the difference between the requested pressure at the fuel cell inlet and the measured pressure. The controller 110 varies the flow pulse alone, or the frequency, or both, as discussed below. Thus, the needed pressure at the fuel cell inlet is controlled by the actual measured value, not a calculated value. Other control schemes could also be used.

Figure 4A:
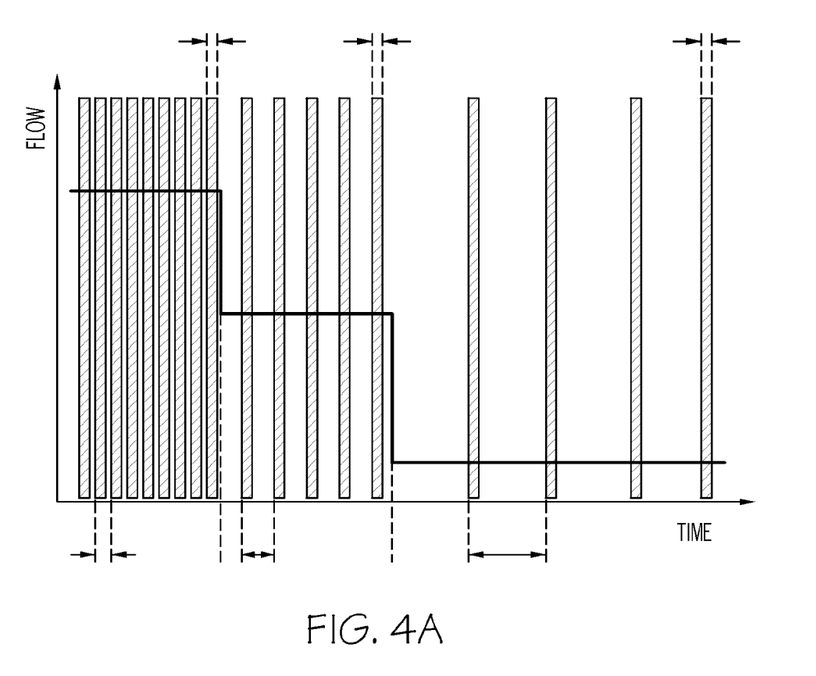
FIGS. 4A-B are illustrations of a pressure control arrangement with the pulse frequency controlled and the resulting pressure.
Figure 4B:
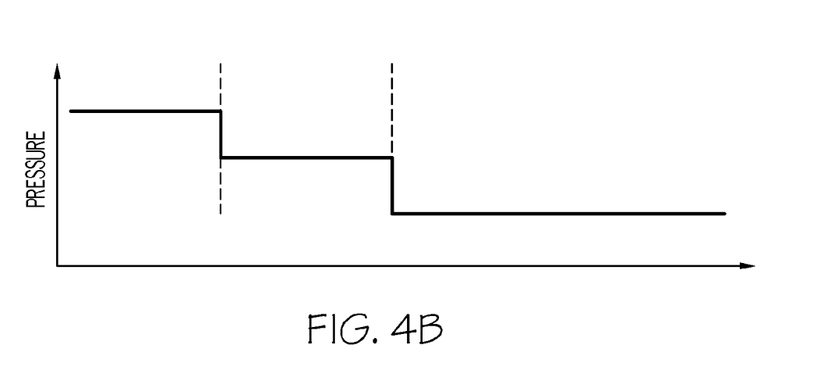
Figure 5A:
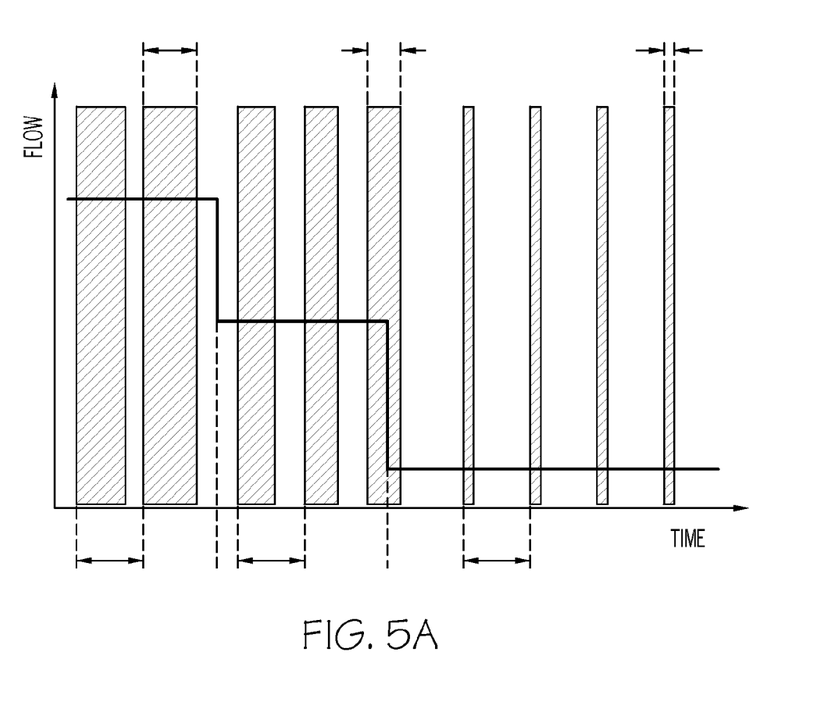
FIGS. 5A-B are illustrations of a pressure control arrangement with the flow pulse width controlled and the resulting pressure.
Figure 5B:
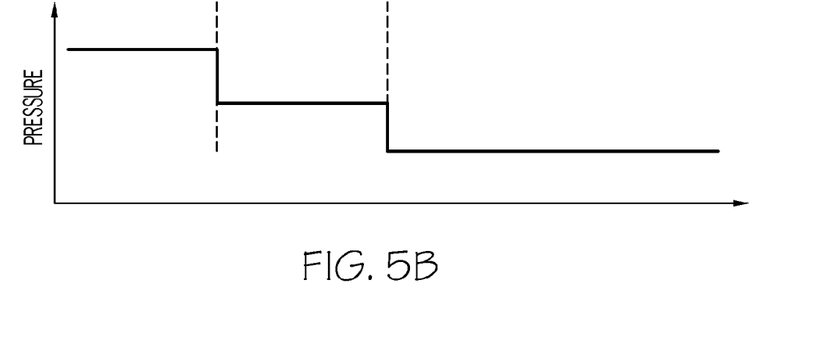
Figure 6A:
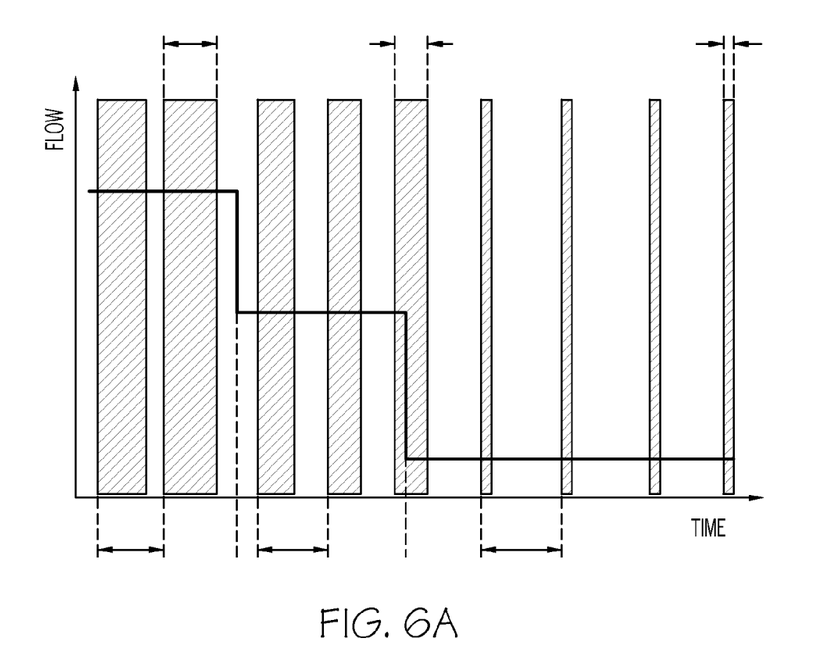
FIGS. 6A-B are illustrations of a pressure control arrangement with the pulse frequency and flow pulse width controlled and the resulting pressure.
Figure 6B:
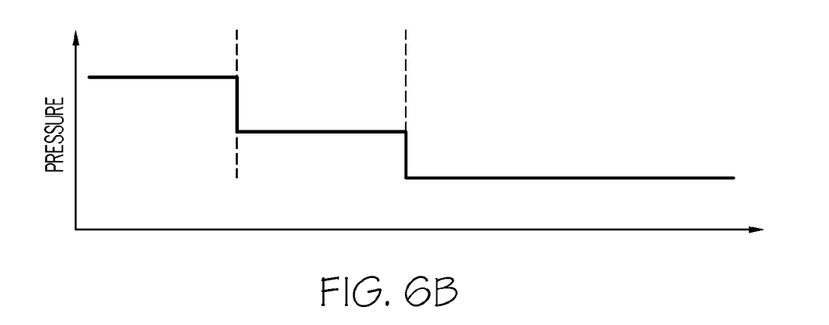

The injector principle controls the gas flow, and the result of the controlled flow is a pressure. Various approaches to pressure control can be used. For example, the flow pulse width can be fixed and the frequency controlled, as shown in FIG. 4A. The resulting pressure is shown in FIG. 4B. Alternatively, the pulse frequency can be fixed, while the flow pulse width is varied, as shown in FIGS. 5A-B. Another type of control involves varying both the flow pulse width and the frequency, as shown in FIG. 6A-B.

Figure 7:
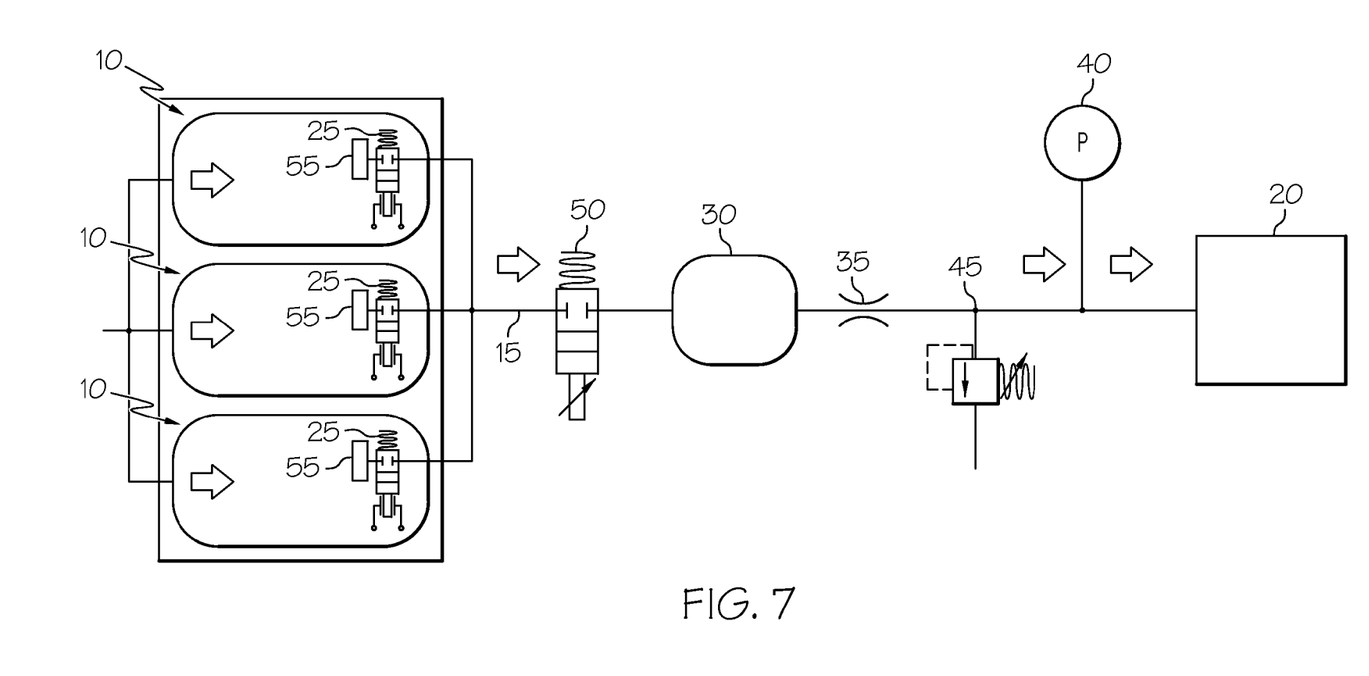
FIG. 7 is an illustration of another embodiment of a fuel supply system for a fuel cell.

FIG. 7 shows an embodiment in which there is more than one fuel supply vessel 10 feeding the fuel cell 20. As shown, there are three vessels 10, each with its own piezoelectric injector 25 and filter 55, which would allow each vessel to be controlled separately. For example, one vessel could be used as a fuel reserve. In this embodiment, the piezoelectric injectors 25 are located in the vessels 10. The output from the three piezoelectric injectors 25 are combined into the same fuel spending line 15. There can be an optional shut-off valve 50, followed by the container 30 and flow restrictor 35 as discussed above. There is a pressure relief valve 45 and pressure sensor 40 before the fuel cell 20.

Figure 8:
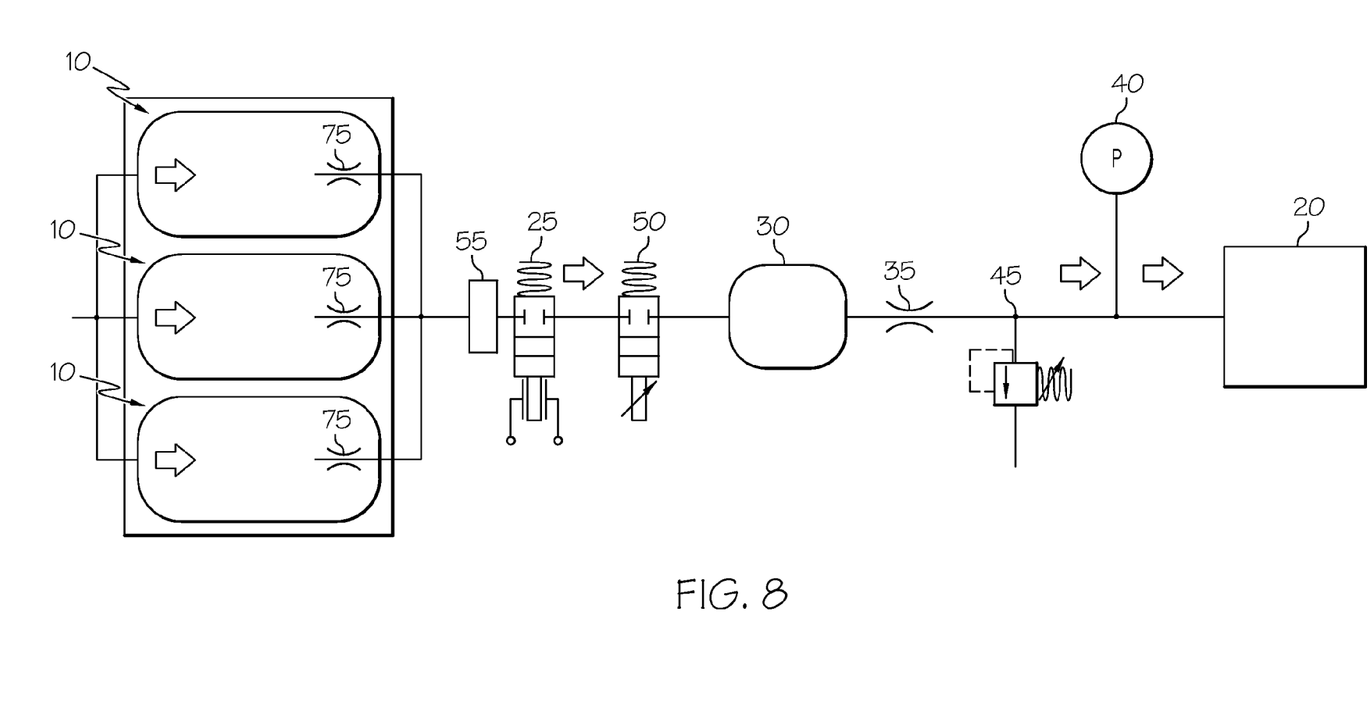
FIG. 8 is an illustration of another embodiment of a fuel supply system for a fuel cell

FIG. 8 shows another embodiment in which more than one fuel supply vessel 10 feeds the fuel cell 20. In this embodiment, the output from three vessels 10 is combined in fuel spending line 15. When the piezoelectric injector 25 is not in the fuel supply vessel, each vessel 10 has an internal flow limiter (or flow restrictor) 75. The flow limiter 75 at the outlet of the vessel 10 is a desirable safety feature. These flow limiters 75 limit the gas release in case of rupture of the vessel(s). The piezoelectric valve 25 is tight to ambient itself, or it can be integrated inside the fuel spending line 15. If the piezoelectric valve is integrated in the fuel spending line 15, the "seal to ambient" function is shifted to the fuel spending line. The tightness to ambient has to be assured always. There can be an optional filter 55 before the piezoelectric injector 25, if desired. The optional shut-off valve 50, container 30, flow restrictor 35, pressure relief valve 45 and pressure sensor 40 follow.

For compressed gas systems in vehicles, the design incorporating the piezoelectric injector could be integrated into smaller space than multiple mechanical pressure regulators.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A fuel supply system for a vehicular fuel cell, the fuel supply system comprising:
    a vehicular fuel supply vessel configured to hold a compressed gaseous fuel;
    a fuel spending line in fluid communication with the vehicular fuel supply vessel and the vehicular fuel cell;
    a piezoelectric injector positioned in the vehicular fuel supply vessel, said piezoelectric injector being in fluid communication with the fuel spending line and configured to vary a flow pulse width or a flow pulse frequency, or both, of the compressed gaseous fuel injected into the fuel spending line and thereby control the pressure of the gaseous fuel at an inlet of the vehicular fuel cell, the piezoelectric injector having an injector fluid inlet and an injector fluid outlet disposed inside the vehicular fuel supply vessel;
    a pressure sensor connected to the fuel spending line and positioned between the vehicular fuel supply vessel and the vehicular fuel cell, the pressure sensor being configured to measure the pressure at the vehicular fuel cell inlet; and
    a controller communicatively coupled to the pressure sensor and the piezoelectric injector, the controller being configured to control the pressure at the inlet of the vehicular fuel cell by varying a flow pulse signal to the piezoelectric injector.

2. The fuel supply system of claim 1 further comprising a shut-off valve connected to the fuel spending line and positioned between the vehicular fuel supply vessel and the pressure sensor.

3. The fuel supply system of claim 1 further comprising a pressure relief valve connected to the fuel spending line and positioned between the vehicular fuel supply vessel and the vehicular fuel cell.

4. The fuel supply system of claim 3 wherein the pressure relief valve is positioned between the vehicular fuel supply vessel and the pressure sensor.

5. The fuel supply system of claim 1 wherein the piezoelectric injector is positioned in a boss of the vehicular fuel supply vessel.

6. The fuel supply system of claim 1 wherein the system comprises a plurality of the vehicular fuel supply vessels and a plurality of the piezoelectric injectors, and wherein each of the vehicular fuel supply vessels comprises at least one of the piezoelectric injectors positioned therein.

7. The fuel supply system of claim 1 further comprising a filter positioned before the piezoelectric injector.

8. The fuel supply system of claim 7 further comprising a shield positioned before the filter.

9. The fuel supply system of claim 1 further comprising a pressure pulse filter positioned between the piezoelectric injector and the vehicular fuel cell, the pressure pulse filter in fluid communication with the fuel spending line.

10. The fuel supply system of claim 9 wherein the pressure pulse filter comprises a container in fluid communication with a flow restrictor.

11. The fuel supply system of claim 6 wherein the controller controls the pressure at the inlet of the fuel cell by varying the flow pulse signal for select ones of the piezoelectric injectors.

12. The fuel supply system of claim 1 wherein the flow pulse signal comprises the flow pulse frequency and the flow pulse width and the flow pulse width is fixed and the frequency is varied to control the pressure at the fuel cell inlet.

13. The fuel supply system of claim 1 wherein the flow pulse signal comprises the flow pulse frequency and the flow pulse width and the flow pulse frequency is fixed and the pulse width is varied to control the pressure at the fuel cell inlet.

14. The fuel supply system of claim 1 wherein the flow pulse signal comprises the flow pulse frequency and the flow pulse width and the flow pulse frequency and the flow pulse width are varied to control the pressure at the fuel cell inlet.

15. A fuel pressure control system comprising:
    a fuel cell, a plurality fuel supply vessels, a fuel spending line, a plurality of piezoelectric injectors, a controller, and a pressure sensor, wherein:
    the fuel spending line fluidly couples the plurality of fuel supply vessels and the fuel cell;
    each of the fuel supply vessels retains a compressed gaseous fuel;
    the fuel cell comprises an inlet fluidly coupled to the fuel spending line;
    each of the piezoelectric injectors is in fluid communication with the fuel spending line, a respective one of the plurality of fuel supply vessels, and the inlet of the fuel cell, each of the piezoelectric injectors being configured to vary a flow pulse width or a flow pulse frequency, or both, of the compressed gaseous fuel injected into the fuel spending line and thereby control the pressure of the gaseous fuel at the inlet of the fuel cell, each of the piezoelectric injectors having an injector inlet and an injector outlet located inside a respective one of the fuel supply vessels;
    the pressure sensor is connected to the fuel spending line and positioned between the fuel supply vessel and the fuel cell; and
    the controller is communicatively coupled to the pressure sensor and the piezoelectric injector, the controller being configured to control the pressure at the inlet of the fuel cell by varying a flow pulse signal to the piezoelectric injector.

16. The fuel pressure control system of claim 14 wherein the flow pulse signal comprises the flow pulse frequency and the flow pulse width and at least one of the flow pulse frequency and the flow pulse width are varied to control the pressure at the fuel cell inlet.

17. A method of controlling a pressure of a compressed gas at an inlet of a fuel cell, the method comprising:
    providing a fuel supply system comprising:
        a fuel supply vessel;
        a fuel spending line in fluid communication with the fuel supply vessel and the fuel cell;
        a piezoelectric injector positioned in said fuel supply vessel and in fluid communication with the fuel spending line, said piezoelectric injector being configured to vary a flow pulse width or a flow pulse frequency, or both, of the compressed gas injected into the fuel spending line and thereby control the pressure of the compressed gas at the fuel cell inlet, the piezoelectric injector having an injector inlet and an injector outlet located inside the fuel supply vessel; and a pressure sensor connected to the fuel spending line and positioned between the fuel supply vessel and the fuel cell;

providing a gas flow through the fuel spending line from the fuel supply vessel;

measuring a pressure with the pressure sensor;

comparing the measured pressure with a reference pressure; and controlling the piezoelectric injector, by varying a flow pulse signal sent to the piezoelectric injector, based on a difference between the measured pressure and the reference pressure.

18. The method of claim 17 wherein controlling the piezoelectric injector comprises adjusting the flow pulse signal to thereby change the flow pulse width or the pulse frequency, or both, of the compressed gas injected into the fuel spending line.

19. The method of claim 17 wherein the fuel supply system comprises a plurality of the fuel supply vessels and a plurality of the piezoelectric injectors, and wherein each of the fuel supply vessels has at least one of the piezoelectric injectors, and wherein each of the piezoelectric injectors is controlled separately.

20. The method of claim 17 wherein the fuel supply system further comprises a pressure relief valve connected to the fuel spending line and positioned between the fuel supply vessel and the fuel cell, the method further comprising opening the pressure relief valve when the measured pressure exceeds a predetermined pressure.

\* \* \* \* \*